United States Patent
Garcia

(10) Patent No.: US 10,152,794 B2
(45) Date of Patent: Dec. 11, 2018

(54) METHOD AND SYSTEM FOR CALIBRATING A CAMERA OF A VEHICLE

(71) Applicants: CONTINENTAL AUTOMOTIVE FRANCE, Toulouse (FR); CONTINENTAL AUTOMOTIVE GMBH, Hannover (DE)

(72) Inventor: Lucien Garcia, Tournefeuille (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 194 days.

(21) Appl. No.: 15/105,584

(22) PCT Filed: Dec. 15, 2014

(86) PCT No.: PCT/EP2014/003357
§ 371 (c)(1),
(2) Date: Jun. 17, 2016

(87) PCT Pub. No.: WO2015/090553
PCT Pub. Date: Jun. 25, 2015

(65) Prior Publication Data
US 2016/0328851 A1 Nov. 10, 2016

(30) Foreign Application Priority Data

Dec. 19, 2013 (FR) ..................... 13 63126

(51) Int. Cl.
*H04N 7/18* (2006.01)
*G06T 7/00* (2017.01)
(Continued)

(52) U.S. Cl.
CPC .......... *G06T 7/0018* (2013.01); *G01B 11/002* (2013.01); *G01B 21/042* (2013.01);
(Continued)

(58) Field of Classification Search
CPC ........... H04N 7/18; G06T 7/0018; G06T 7/80; G06T 2207/30204; G06T 2207/30252; G01B 11/002; G01B 21/042
(Continued)

(56) References Cited

U.S. PATENT DOCUMENTS 7,124,046 B2 * 10/2006 Maeda ............... H04N 13/0246
702/104
8,605,156 B2 * 12/2013 Takeda ............... G06K 9/00791
348/175
(Continued)

FOREIGN PATENT DOCUMENTS

CN 101040298 A 9/2007
CN 101676686 A 3/2010
(Continued)

OTHER PUBLICATIONS

International Search Report and Written Opinion PCT/EP2014/003357 dated Mar. 23, 2015.
(Continued)

*Primary Examiner* — Trang U Tran
(74) *Attorney, Agent, or Firm* — Young & Thompson

(57) ABSTRACT

A method, a medium (20) and a system (10) for calibrating a camera (32) of a vehicle (30). The calibration system (10) is remarkable in that it includes a calibration medium (20), including at least a first calibration reference (24) and a mirror (26), and a vehicle (30), including at least a second calibration reference (34). The method can be used to calibrate the camera (32) by determining the spatial compensation values between the camera (32) and the vehicle (30), without any need to align the vehicle (30) perfectly facing the calibration medium (20).

20 Claims, 2 Drawing Sheets

(51) Int. Cl.
*G01B 21/04* (2006.01)
*G01B 11/00* (2006.01)
*G06T 7/80* (2017.01)

(52) U.S. Cl.
CPC ...... *G06T 7/80* (2017.01); *G06T 2207/30204* (2013.01); *G06T 2207/30252* (2013.01)

(58) Field of Classification Search
USPC .................................................. 348/148, 86
See application file for complete search history.

(56) References Cited

U.S. PATENT DOCUMENTS

| | | | |
|---|---|---|---|
| 9,361,687 B2* | 6/2016 | Shimoda | G06T 7/0018 |
| 9,491,451 B2* | 11/2016 | Pliefke | B60R 1/002 |
| 2010/0238291 A1* | 9/2010 | Pavlov | B60R 11/04 |
| | | | 348/148 |
| 2011/0310250 A1 | 12/2011 | Inui et al. | |
| 2012/0320190 A1 | 12/2012 | Natroshvili et al. | |

FOREIGN PATENT DOCUMENTS

| | | |
|---|---|---|
| CN | 102982526 A | 3/2013 |
| DE | 102007032471 | 1/2009 |
| DE | 102011013773 | 1/2012 |
| EP | 1873716 | 1/2008 |
| EP | 2233365 | 9/2010 |

OTHER PUBLICATIONS

Heikkila et al., "A Four-step Camera Calibration Procedure with Implicit Image Correction", (1997), Infotech Oulu and Department of Electrical Engineering, University of Oulu, pp. 1-7.

Hesch et al., "Mirror-Based Extrinsic Camera Calibration", (2008), Department of Computer Science and Engineering, University of Minnesota; Department of Electrical Engineering, University of California, Riverside, pp. 1-16.

* cited by examiner

METHOD AND SYSTEM FOR CALIBRATING A CAMERA OF A VEHICLE

BACKGROUND OF THE INVENTION

Field of the Invention

The present invention relates to the field of systems for assisting the driving of a vehicle, notably a motor vehicle, and concerns a method and a system for calibrating a camera of a vehicle.

At the present time, a motor vehicle usually comprises a system for assisting driving known by the acronym ADAS ("Advanced Driver Assistance System").

This system comprises, in a known way, a camera mounted on the windshield of the vehicle, which can be used, for example, to assist the driver in his maneuvers or to detect an obstacle or the crossing of a white line.

The information yielded by the images captured by the camera must be sufficiently reliable and relevant to provide effective assistance to the vehicle driver.

A preliminary calibration of the camera must therefore be performed, in order to compensate for manufacturing defects (parameters intrinsic to the camera) and/or for positioning faults (parameters extrinsic to the camera).

The intrinsic parameters to be compensated are, for example, the focal length of the camera, its distortion, the position of the lens relative to the camera sensor, and the like.

The extrinsic parameters to be compensated are the translation and rotation of the camera relative to the three spatial dimensions (six parameters), referred to below as "spatial compensation values".

The calibration of the extrinsic parameters is performed initially in the factory at the end of the vehicle manufacturing process, and is then usually repeated subsequently, for example in a workshop or a showroom during routine servicing or following a windshield repair, in order to compensate solely for the extrinsic parameters of the camera.

Description of the Related Art

A known calibration method consists in using the vehicle camera to acquire images of a calibration medium, in order to determine the values of compensation for the intrinsic and/or extrinsic parameters of the camera.

As shown in FIG. 1, this calibration medium 1 comprises a plurality of calibration references 4 placed side by side in two rows 2 and two columns 3 so as to form a square. Each calibration reference 4 conventionally takes the form of a two-dimensional geometrical element, having a square shape for example, comprising two diagonally opposed portions colored black, the other two portions being colored white.

In a known way, in a first step, the vehicle must be aligned perfectly facing the calibration medium 1 so that their respective three-dimensional reference frames are parallel in order to eliminate differences in polar angle between the vehicle and the calibration medium 1. In other words, the alignment of the vehicle facing the calibration medium 1 makes it possible to eliminate the rotation values and to determine the translation values in a known way in the three spatial dimensions between the vehicle and the calibration medium 1.

In a second step, the camera then captures at least one image of the calibration medium, in order to determine in a known manner the rotation and translation compensation values in the three spatial dimensions between the camera and the calibration references of the medium, using what is known as the "pinhole" model, such as that described in the document "A Four-step Camera Calibration Procedure with Implicit Image Correction" (Janne Heikkilä and Olli Silvén, University of Oulu, Finland).

Finally, in a third step, when the values of translation in the three spatial dimensions between the vehicle and the calibration medium and the values of rotation and translation compensation in the three spatial dimensions between the camera and the calibration references of the medium are known, the values of rotation compensation, or calibration compensation, between the camera and the vehicle are deduced from these known values, and are then stored by the vehicle's driver assistance system, in order to provide permanent compensation for the camera during its use.

However, the alignment of the vehicle facing the calibration medium must be relatively precise, requiring a time-consuming operation and costly equipment such as alignment platforms, rollers, lasers, and the like, which represents a first disadvantage.

Furthermore, this alignment equipment is not always available outside the factory of production, for example at a workshop or showroom when it is desired to recalibrate the extrinsic parameters, after a repair or servicing operation for example, and this represents a second disadvantage.

Thus there is a need to provide a calibration method and system which will be simple, reliable and inexpensive.

BRIEF SUMMARY OF THE INVENTION

The object of the present invention is to overcome these disadvantages, at least in part, by proposing a method, a medium and a system for easily calibrating a camera of a driver assistance system of a vehicle.

To this end, the invention relates, in the first place, to a method for calibrating a camera of a vehicle, based on a calibration medium comprising at least a first calibration reference, said method being remarkable in that, the calibration medium comprising a mirror and the vehicle comprising at least a second calibration reference, it comprises:
  a first step of determining the spatial compensation values between the camera and the first calibration reference,
  a second step of determining the spatial compensation values between the camera and the image of the second calibration reference via the mirror,
  a third step of determining the spatial compensation values between the camera and the second calibration reference on the basis of the spatial compensation values determined in the first and second steps,
  a fourth step of determining the spatial compensation values between the camera and the vehicle on the basis of the spatial compensation values between the vehicle and the second calibration reference.

Preferably, the method comprises a preliminary step of determining the spatial compensation values between the vehicle and the second calibration reference. When the position of the second calibration reference on the vehicle, that is to say the position of the second calibration reference in a reference frame associated with the vehicle, is known, these values are easily determined, since they correspond to the three rotations and three translations required to move from the center of said reference frame associated with the vehicle to the center of the second calibration reference.

The spatial compensation values between the camera and the first calibration reference correspond to the three rotations and the three translations required to move from the center of a reference frame associated with the camera to the center of the first calibration reference.

Similarly, the spatial compensation values between the camera and the image of the second calibration reference via the mirror correspond to the three rotations and the three translations required to move from the center of the reference frame associated with the camera to the center of the image of the second calibration reference reflected by the mirror.

The compensation values between the camera and the second calibration reference correspond to the three rotations and the three translations required to move from the center of the reference frame associated with the camera to the center of the second calibration reference.

Thus, when the three rotations and the three translations required to move from the center of a reference frame associated with the camera to the center of the first calibration reference, on the one hand, and the three rotations and the three translations required to move from the center of the reference frame associated with the camera to the center of the image of the second calibration reference reflected by the mirror, on the other hand, are known, it is possible to deduce from these the three rotations and the three translations required to move from the center of the reference frame associated with the camera to the center of the second calibration reference, the second calibration reference being the inverse image of the image of the second calibration reference via the mirror, which is itself associated with the first calibration reference.

Finally, given a previous knowledge of the three rotations and the three translations required to move from the center of a reference frame associated with the vehicle to the center of the second calibration reference, it is easy to deduce from these the three rotations and the three translations required to move from the center of the reference frame associated with the camera to the center of the reference frame associated with the vehicle, that is to say the calibration values of the camera.

The method according to the invention thus simply comprises a first step of determining the compensation values between the camera and the calibration medium and a second step of determining the compensation values between the camera and the vehicle on the basis of the compensation values between the camera and the calibration medium determined previously, and on the basis of the second calibration reference, whose position on the vehicle is known.

Therefore it is no longer necessary to align the vehicle perfectly in order to carry out the calibration of the camera, which is consequently fast, as well as being easy and reliable.

This method is also advantageously inexpensive, since it is simply necessary to add a mirror to the calibration medium and/or one or more calibration references on the vehicle.

According to one aspect of the invention, the calibration medium comprises a plurality of first references, and the spatial compensation values between the camera and the plurality of first calibration references are determined by determining the coefficients of a six-variable nonlinear system, each of whose coefficients represents a rotation or translation value in the three spatial dimensions, the coefficient associated with each variable of the nonlinear system being determined by associating the spatial coordinates of the center of each calibration reference with the coordinates of said center in the captured image.

The invention also relates to a calibration medium comprising at least a first calibration reference and a mirror.

The mirror is preferably a flat mirror. This is because a mirror of this type is strictly anastigmatic, thus enabling an image reflected in the mirror to retain its sharpness.

Preferably also, the calibration medium is fixed during the calibration of the camera, so that the images reflected by the mirror and captured by the camera are sharp.

Advantageously, the calibration medium comprises a plurality of first calibration references, preferably at least three.

In an embodiment of the system according to the invention, the first calibration references are positioned around the mirror, preferably consecutively.

The calibration medium may take the form of a wall or a panel on which the first reference or references are positioned, and to which the mirror is fixed.

The invention also relates to a system for calibrating a camera of a vehicle, said system comprising a calibration medium as described previously and a vehicle, notably a motor vehicle, comprising at least a camera to be calibrated and at least a second calibration reference.

According to a characteristic of the invention, the vehicle comprises a windshield on which the camera is mounted.

Advantageously, a second calibration reference is positioned on the windshield of the vehicle, for example below or above the camera.

According to another characteristic of the invention, the vehicle comprises a plurality of second calibration references, preferably at least three, in order to improve the calibration quality.

The first calibration reference or references and the second calibration reference or references may be of different shapes and colors.

According to one aspect of the invention, the first calibration reference and the second calibration reference take the form of geometrical elements of round or square shape, preferably divided into four portions, two of which are of a dark color, black for example, while the other two are of a light color, white for example; alternatively, they take the form of a black dot surrounded by a white disk.

BRIEF DESCRIPTION OF THE DRAWINGS

Other characteristics and advantages of the invention will be apparent from the following description which refers to the attached drawings, provided by way of non-limiting examples, in which identical references are given to similar objects.

DETAILED DESCRIPTION OF THE PREFERRED EMBODIMENTS

Figure 1:
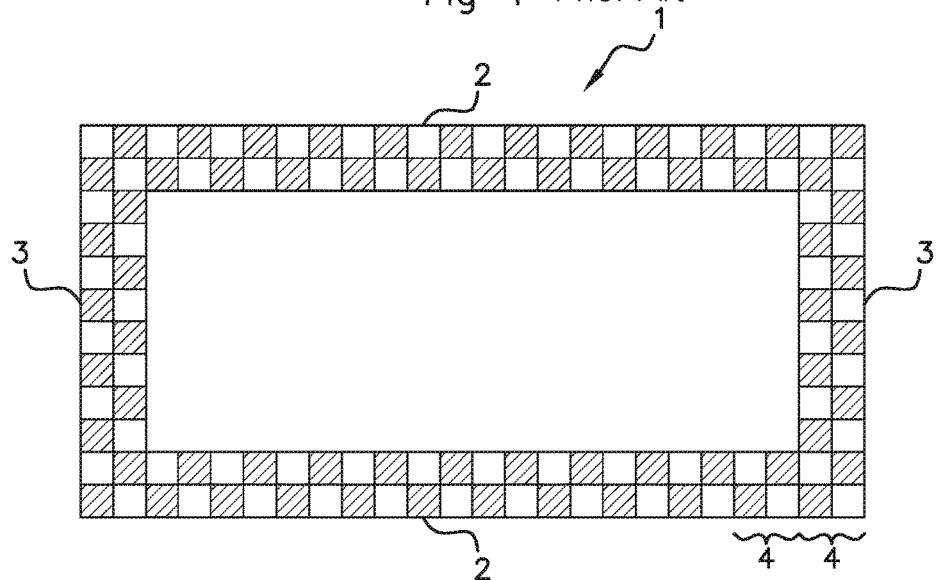
FIG. 1 (described above) shows a prior art calibration medium.
Figure 2:
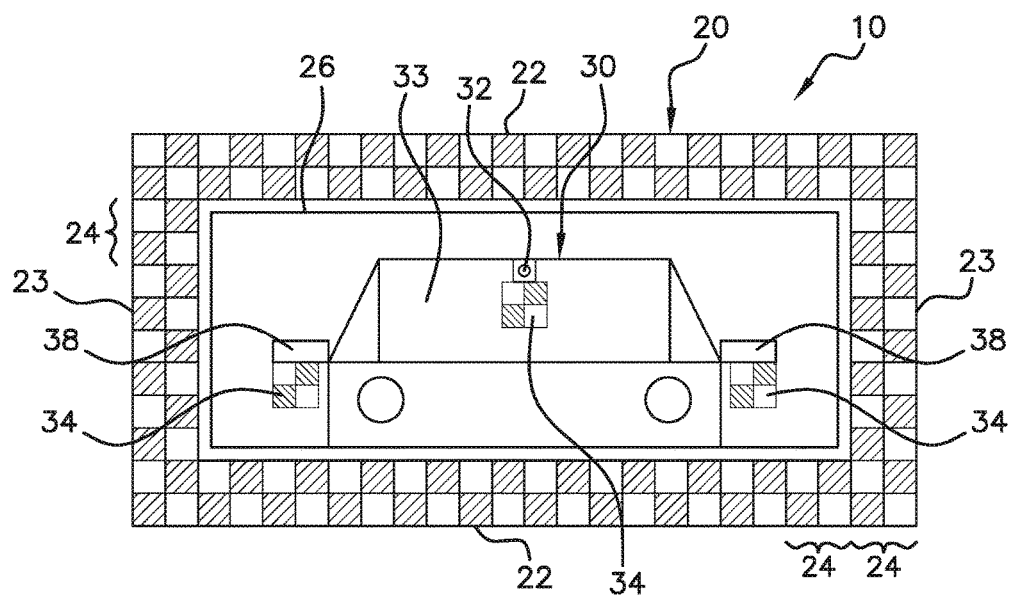
FIG. 2 shows schematically an embodiment of a calibration system according to the invention.
Figure 3:
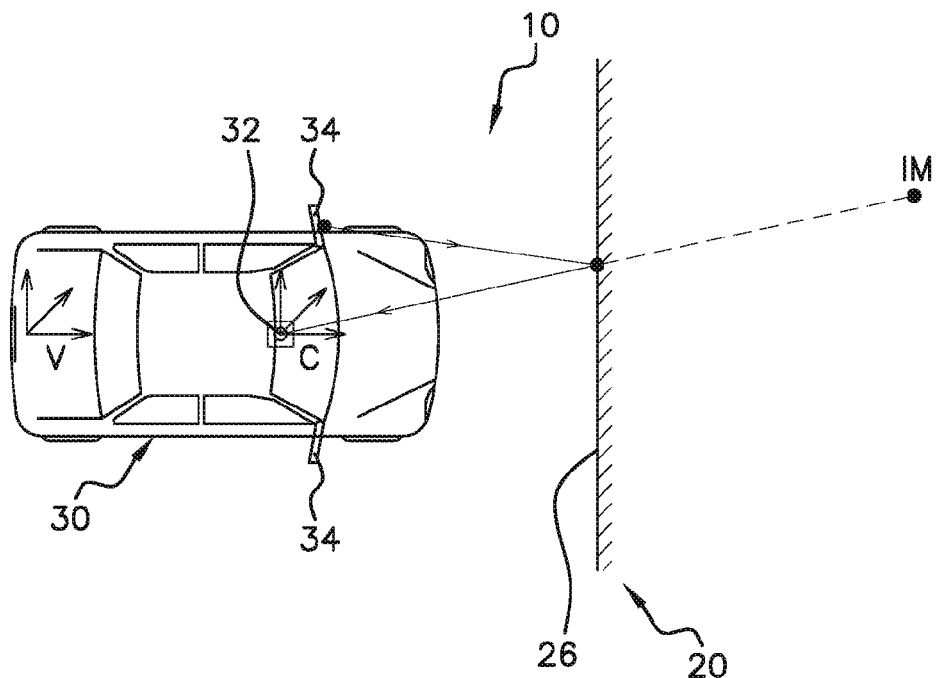
FIG. 3 is a side view of the system of FIG. 2.

FIGS. 2 and 3 show an embodiment of the system 10 according to the invention.

The system 10 according to the invention can be used to calibrate a camera 32 mounted in a vehicle 30.

In this example, the calibration system 10 is shown with a motor vehicle 30. However, this illustration evidently does not limit the scope of the present invention, and the system 10 according to the invention may comprise any type of vehicle equipped with a camera to be calibrated.

For clarity, the references of FIG. 2 concerning the vehicle are stated relative to the image of the vehicle 30 via the mirror 26 of the calibration medium 20.

As shown in FIGS. 2 and 3, the system 10 comprises a calibration medium 20 and a motor vehicle 30.

In this example, as shown in FIG. 3, the calibration medium 20 takes the form of a panel.

Evidently, however, any suitable medium may be used for calibrating the camera 32, such as a wall, for example.

In the example shown in FIG. 2, the calibration medium 20 comprises a plurality of first calibration references 24 placed side by side in two rows 22 and two columns 23 so as to form a square.

Also in this example, each calibration reference 24 takes the form of a checkerboard having two diagonally opposed portions colored black, the other two portions being colored white.

Evidently, the calibration references 24 may take any suitable form, for example a black dot surrounded by a white disk or other.

According to the invention, the calibration medium 20 comprises a mirror 26, preferably flat, in which the image of the vehicle 30 is reflected.

In this example, again with reference to FIG. 2, the mirror 26 is rectangular and extends in the center of the square formed by the two rows 22 and the two columns 23 of first calibration references 24.

The image of the second calibration reference via the mirror is located at a distance equal to twice the distance between the camera and the premier calibration reference, and is known relative to the calibration medium.

The vehicle 30 therefore comprises a camera 32 to be calibrated, mounted in the middle of the upper edge of the windshield 33 of the vehicle 30.

According to the invention, the vehicle 30 comprises at least a second calibration reference 34, or preferably at least three non-aligned second calibration references 34.

In this example, as shown in FIG. 2, the vehicle 30 comprises a second calibration reference 34 positioned on the windshield 33, under the camera 32, and two other calibration references 34 positioned on either side of the vehicle 30, on its exterior rear-view mirrors 38 for example.

The calibration medium 20 remains fixed during the period of calibration of the camera 32.

Figure 4:
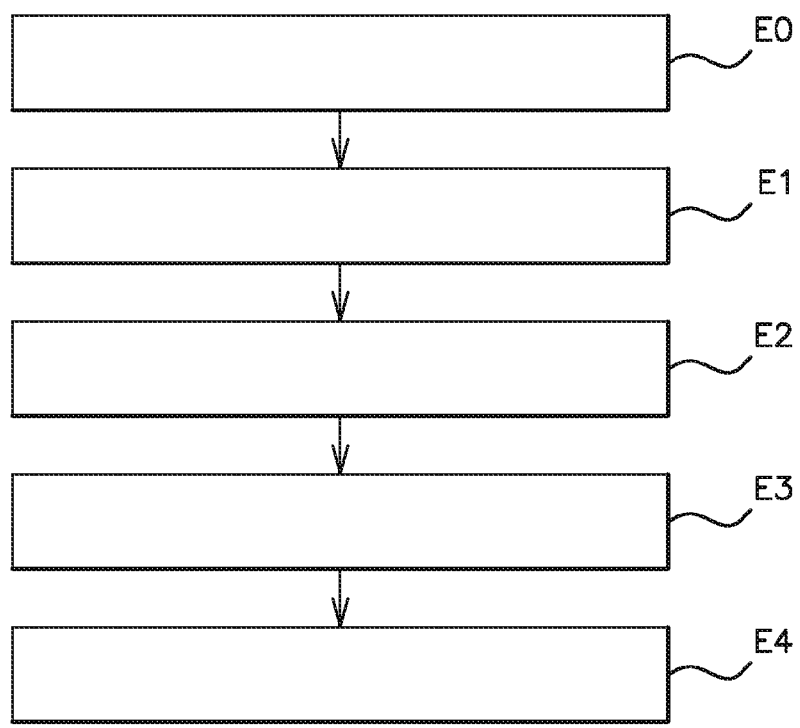
FIG. 4 illustrates the method according to the invention.

With reference to FIGS. 3 and 4, the spatial compensation values between the vehicle 30 and the second calibration references 34 are determined in a known way in a preliminary step E0.

These values correspond to the three rotations and the three translations required to move from the center of the reference frame V associated with the vehicle 30 to the center of each of the second calibration references 34.

With reference to FIG. 4, the spatial compensation values between the camera 32 and the first calibration references 24 are determined in a first step E1.

These spatial compensation values correspond to the three rotations and the three translations required to move from the center of a reference frame C associated with the camera 32 to the center of each of the first calibration references 24 of the calibration medium 20.

These spatial compensation values are determined in a known way, using the "pinhole model", as it is called in English.

In this method, a curve representing the spatial coordinates of the centers of the first calibration references 24 as a function of their position in the image or images of the calibration medium acquired by the camera 32 is initially determined.

The equation defining said curve notably comprises six variables whose coefficients correspond to the three translations and three rotations required to move from the position of the center of each reference to its corresponding position on an image acquired by the camera.

This method of parametric identification of a nonlinear system is well known to those skilled in the art, and therefore will not be detailed further here.

The calibration of the camera 32 is carried out on the basis of the spatial compensation values between the camera 32 and the vehicle 30.

In order to determine these values, with reference to FIGS. 3 and 4, the method according to the invention comprises a second step E2 of determining the spatial compensation values between the camera 32 and the images IM of the second calibration references 34 via the mirror 26 of the calibration medium 20. For the sake of clarity, a single image IM of a second calibration reference 34 has been shown in FIG. 3.

These spatial compensation values between the camera 32 and the image IM of the second calibration references 34 via the mirror 26 correspond to the three rotations and the three translations required to move from the center of the reference frame C associated with the camera 32 to the center of the image IM of the second calibration reference 34 reflected by the mirror 26.

These values are determined, also in a known way, using the pinhole model.

Then, in a third step E3, the spatial compensation values between the camera 32 and the second calibration references 34 are deduced by a geometric transform known to those skilled in the art (rotation and translation between two coordinate systems), on the basis of the spatial compensation values determined in the first step E1 and the second step E2.

These compensation values correspond to the three rotations and the three translations required to move from the center of the reference frame C associated with the camera 32 to the center of the second calibration reference 34.

More precisely, when the three rotations and the three translations required to move from the center of a reference frame C associated with the camera 32 to the center of the first calibration reference 24 (first step E1) of the calibration medium 20, on the one hand, and the three rotations and the three translations required to move from the center of the reference frame C associated with the camera 32 to the center of the image IM of the second calibration reference 34 reflected by the mirror 26 (second step E2), on the other hand, are known in this way, it is possible to deduce from these, by a geometric calculation known to those skilled in the art (coordinates of a point reflected by a mirror), the three rotations and the three translations required to move from the center of the reference frame C associated with the camera 32 to the center of each of the second calibration references 34, each of these references being the inverse image of the image IM of the corresponding second calibration reference 34 via the mirror 26, which is itself associated with the first calibration references 34.

Finally, when the position of the second calibration references 34 in the reference frame V of the vehicle 30 is known, then, in a fourth step E4, the spatial compensation values between the camera 32 and the vehicle 30 are then deduced from this position, by a geometric transform known to those skilled in the art, as explained below.

For example, if A, B and C are three points in the space of respective coordinates (Xa, Ya, Za), (Xb, Yb, Zb) and (Xc, Yc, Zc), the movement from point A to point C via point B takes place in three translations and three rotations in a known way, in the following manner (r being the rotation in the Euler representation, and t being the Euclidean translation).

Initially, there is a movement from point A to point B as follows:

$$\begin{vmatrix} Xa \\ Ya \\ Za \\ 1 \end{vmatrix} = Hab * \begin{vmatrix} Xa \\ Yb \\ Zb \\ 1 \end{vmatrix} = \begin{vmatrix} rab11 & rab12 & rab13 & tabx \\ rab21 & rab22 & rab23 & taby \\ rab31 & rab32 & rab33 & tabz \\ 0 & 0 & 0 & 1 \end{vmatrix} * \begin{vmatrix} Xb \\ Yb \\ Zb \\ 1 \end{vmatrix}$$

where rab11, rab12 and rab13 are the components of the rotation matrix according to the X axis, rab21, rab22 and rab23 are the components of the rotation matrix according to the Y axis, rab31, rab32 and rab33 are the components of the rotation matrix according to the Z axis, tabx is the component of the translation according to the X axis, taby is the component of the translation according to the Y axis, and tabz is the component of the translation according to the Z axis.

Similarly, mutatis mutandis, to move from point B to point C:

$$\begin{vmatrix} Xb \\ Yb \\ Zb \\ 1 \end{vmatrix} = Hbc * \begin{vmatrix} Xc \\ Yc \\ Zc \\ 1 \end{vmatrix} = \begin{vmatrix} rbc11 & rbc12 & rbc13 & tbcx \\ rbc21 & rbc22 & rbc23 & tbcy \\ rbc31 & rbc32 & rbc33 & tbcz \\ 0 & 0 & 0 & 1 \end{vmatrix} * \begin{vmatrix} Xc \\ Yc \\ Zc \\ 1 \end{vmatrix}$$

From which the rotation and translation matrix for moving from point A to point C is deduced:

$$\begin{vmatrix} Xa \\ Ya \\ Za \\ 1 \end{vmatrix} - Hab * Hbc * \begin{vmatrix} Xc \\ Yc \\ Zc \\ 1 \end{vmatrix} - Hac * \begin{vmatrix} Xc \\ Yc \\ Zc \\ 1 \end{vmatrix}; Hab * Hbc - Hac$$

In this case, given a previous knowledge of the three rotations and the three translations required to move from the center of the reference frame V associated with the vehicle to the center of each of the second calibration references 34, it is easy to deduce from these the three rotations and the three translations required to move from the center of the reference frame C associated with the camera 32 to the center of the reference frame V associated with the vehicle 30, that is to say the calibration values of the camera 32.

The determination of the spatial compensation values, that is to say the calibration of the extrinsic parameters of the camera 32 of a vehicle 30, is thus carried out easily, rapidly and reliably without any need for the preliminary perfect alignment of the vehicle 30 with the calibration medium 20 as in the prior art.

This method is also advantageously inexpensive, since it is simply necessary to add a mirror 26 to the calibration medium 20 and one or more (second) calibration references 34 on the vehicle 30.

The invention claimed is:

1. A method for calibrating a camera (32) of a vehicle (30), based on a calibration medium (20) comprising at least one first calibration reference (24), the calibration medium (20) comprising a mirror (26) and the vehicle (30) comprising at least one second calibration reference (34), wherein the method comprises:

aligning the vehicle with the camera and the vehicle facing the mirror of the calibration medium with the at least one second calibration reference (34) reflecting in the mirror;

a first step (E1) of using the camera to take a first image of the at least one first calibration reference (24) and using a position in the first image of the at least one first calibration reference (24) in determining first spatial compensation values between the camera (32) and the at least one first calibration reference (24), the first spatial compensation values corresponding to a first set of three rotations and three translations required to move from a center of a reference frame (C) associated with the camera to a center of the first calibration reference;

a second step (E2) of using the camera to take a second image of the at least one second calibration reference (34) via the mirror (26) and using the second image in determining second spatial compensation values between the camera (32) and the second image (IM) of the at least one second calibration reference (34), the second spatial compensation values corresponding to a second set of three rotations and three translations required to move from the center of the reference frame associated with the camera to a center of the image of the second calibration reference reflected by the mirror;

a third step (E3) of determining third spatial compensation values between the camera (32) and the at least one second calibration reference (34) on a basis of the first and second spatial compensation values determined in the first step (E1) and the second step (E2), the third compensation values corresponding to a third set of three rotations and three translations required to move from the center of the reference frame associated with the camera to the center of the second calibration reference;

a fourth step (E4) of determining fourth spatial compensation values between the camera (32) and the vehicle (30) on a basis of the third spatial compensation values determined in the third step (E32) and fifth spatial compensation values between the vehicle (30) and the at least one second calibration reference (34), the fifth spatial compensation values corresponding to a fourth set of three rotations and three translations required to move from the center of a reference frame (V) associated with the vehicle to the center of each of the at least one second calibration reference (34); and a fifth step of calibrating the camera (32) of the vehicle (30) on a basis of the fifth spatial compensation values.

2. The method as claimed in claim 1, further comprising a preliminary step (E0) of determining the fifth spatial compensation values between the vehicle (30) and the at least one second calibration reference (34).

3. The method as claimed in claim 1, wherein,
said calibration medium (20) is fixed with respect to the vehicle during the first and second steps,
the calibration medium (20) comprises a wall or a panel (20) with the mirror (26) fixed to the wall or the panel (20), and a plurality of the at least one first calibration reference (24) positioned around the mirror and on the wall or the panel (20), and in the second step, the image of the vehicle is reflected in the mirror.

4. The method as claimed in claim 3, wherein, the vehicle (30) comprises a windshield (33) on which the camera (32) is mounted, and the at least one second calibration reference (34) is positioned on said windshield (33).

5. The method as claimed in claim 4, wherein, the vehicle (30) comprises a plurality of the at least one second calibration reference (34).

6. The method as claimed in claim 4, wherein, the vehicle (30) comprises three of the at least one second calibration reference.

7. The method as claimed in claim 4, wherein, the vehicle (30) comprises three of the at least one second calibration reference, the three of the at least one second calibration reference being non-aligned.

8. The method as claimed in claim 1, wherein, the first step (E1) of determining the first spatial compensation values between the camera (32) and the at least one first calibration reference (24) includes use of a pinhole model which includes a curve that comprises six variables whose coefficients correspond to the first set of the three translations and three rotations required to move from the position of the center of each the at least one first calibration reference (24) to a corresponding position on the first image acquired by the camera.

9. The method as claimed in claim 1, wherein, said calibration medium (20) is fixed with respect to the vehicle during the first and second steps.

10. The method as claimed in claim 1, wherein, said calibration medium (20) is fixed with respect to the vehicle during the camera taking the first and second images, the calibration medium (20) comprises a wall or a panel (20) with the mirror (26) at the wall or the panel (20), and a plurality of the at least one first calibration reference (24) positioned around the mirror and on the wall or the panel (20), and in the second step, the image of the vehicle is reflected in the mirror.

11. A system for calibrating a camera of a vehicle, said system (10) comprising:

the vehicle (30) comprising the camera (32) to be calibrated;

a calibration medium (20) for calibrating the camera (32), said medium (20) being fixed during the calibration of said camera (32), the calibration medium (20) comprising:

a plurality of first calibration references (24), a flat mirror (26), and the medium taking the form of a wall or a panel (20) on which the first calibration references (24) are positioned, and to which the mirror (26) is fixed; and at least one second calibration reference (34), wherein during the calibration of said camera (32) the vehicle is aligned with the camera and the vehicle facing the mirror of the calibration medium with the at least one second calibration reference (34) reflecting in the mirror, the camera operable to take a first image of the at least one first calibration reference (24) suitable in determining first spatial compensation values between the camera (32) and the at least one first calibration reference (24), the first spatial compensation values corresponding to a first set of three rotations and three translations required to move from a center of a reference frame (C) associated with the camera to a center of the first calibration reference, and the camera operable to take a second image of the at least one second calibration reference (34) via the mirror (26) suitable in determining second spatial compensation values between the camera (32) and the second image (IM) of the at least one second calibration reference (34) via the mirror (26), the second spatial compensation values corresponding to a second set of three rotations and three translations required to move from the center of the reference frame associated with the camera to a center of the image of the second calibration reference reflected by the mirror, wherein third spatial compensation values between the camera (32) and the at least one second calibration reference (34) are determinable on a basis of the first and second spatial compensation values, the third compensation values corresponding to a third set of three rotations and three translations required to move from the center of the reference frame associated with the camera to the center of the second calibration reference, and wherein fourth spatial compensation values between the camera (32) and the vehicle (30) are determinable on a basis of the third spatial compensation values and fifth spatial compensation values between the vehicle (30) and the at least one second calibration reference (34), the fifth spatial compensation values corresponding to a fourth set of three rotations and three translations required to move from the center of a reference frame (V) associated with the vehicle to the center of each of the at least one second calibration reference (34).

12. The system as claimed in claim 11, wherein the vehicle (30) comprises a windshield (33) on which the camera (32) is mounted, and the at least one second calibration reference (34) is positioned on said windshield (33).

13. The system as claimed in claim 11, wherein the vehicle (30) comprises a plurality of the at least one second calibration reference (34).

14. The system as claimed in claim 12, wherein the vehicle (30) comprises a plurality of the at least one second calibration reference.

15. The system as claimed in claim 13, wherein the vehicle (30) comprises three of the at least one second calibration reference.

16. The system as claimed in claim 14, wherein the vehicle (30) comprises three of the at least one second calibration reference.

17. A method for calibrating a camera (32) of a vehicle (30), based on a calibration medium (20) comprising at least one first calibration reference (24), the calibration medium (20) comprising a mirror (26) and the vehicle (30) comprising at least one second calibration reference (34), wherein the method comprises:

aligning the vehicle with the camera facing the mirror and with the at least one second calibration reference (34) reflecting in the mirror;

a first step (E1) of using the camera to take a first image of the at least one first calibration reference (24) and using a position in the first image of the at least one first calibration reference (24) in determining first spatial compensation values between the camera (32) and the at least one first calibration reference (24), the first spatial compensation values corresponding to a first set of rotations and translations required to move from a center of a reference frame (C) associated with the camera to a center of the first calibration reference;

a second step (E2) of using the camera to take a second image of the at least one second calibration reference (34) via the mirror (26) and using the second image in determining second spatial compensation values between the camera (32) and the second image (IM) of the at least one second calibration reference (34), the second spatial compensation values corresponding to a second set of rotations and translations required to move from the center of the reference frame associated with the camera to a center of the image of the second calibration reference reflected by the mirror;

a third step (E3) of determining third spatial compensation values between the camera (32) and the at least one second calibration reference (34) on a basis of the first and second spatial compensation values determined in the first step (E1) and the second step (E2), the third compensation values corresponding to a third set of rotations and translations required to move from the center of the reference frame associated with the camera to the center of the second calibration reference;

a fourth step (E4) of determining fourth spatial compensation values between the camera (32) and the vehicle (30) on a basis of the third spatial compensation values determined in the third step (E32) and fifth spatial compensation values between the vehicle (30) and the at least one second calibration reference (34), the fifth spatial compensation values corresponding to a fourth set of rotations and translations required to move from the center of a reference frame (V) associated with the vehicle to the center of each of the at least one second calibration reference (34); and a fifth step of calibrating the camera (32) of the vehicle (30) on a basis of the fifth spatial compensation values.

18. The method as claimed in claim 17, wherein,
said calibration medium (20) is fixed with respect to the vehicle during the first and second steps, and
the calibration medium (20) comprises a wall or a panel (20) with the mirror (26) fixed to the wall or the panel (20), and a plurality of the at least one first calibration reference (24) positioned around the mirror and on the wall or the panel (20).

19. The method as claimed in claim 18, wherein,
the vehicle (30) comprises a windshield (33) on which the camera (32) is mounted,
the vehicle (30) comprises a plurality of the at least one second calibration reference (34), and
one of the plurality of the at least one second calibration reference (34) is positioned on said windshield (33).

20. The method as claimed in claim 18, wherein,
the first step (E1) of determining the first spatial compensation values between the camera (32) and the at least one first calibration reference (24) includes use of a pinhole model which includes a curve that comprises six variables whose coefficients correspond to the first set of the three translations and three rotations required to move from the position of the center of each the at least one first calibration reference (24) to a corresponding position on the first image acquired by the camera.

* * * * *